United States Patent [19]

Ohtani et al.

[11] Patent Number: 4,972,068

[45] Date of Patent: Nov. 20, 1990

[54] RETRIEVAL APPARATUS READILY ADAPTABLE FOR USE WITH VARIOUS TYPES OF RECORDING MEDIA

[75] Inventors: Kazuo Ohtani, Kawasaki; Naoki Manabe, Yokohama; Shigeru Sugita, Sayama; Toshiko Moritani, Tokyo; Masashi Yahara, Yokohama, all of Japan

[73] Assignee: Canon Kabushiki Kaisha, Tokyo, Japan

[21] Appl. No.: 74,575

[22] Filed: Jul. 17, 1987

[30] Foreign Application Priority Data

Jul. 26, 1986 [JP] Japan ................................ 61-176155
Sep. 1, 1986 [JP] Japan ................................ 61-206572
Oct. 24, 1986 [JP] Japan ................................ 61-254290

[51] Int. Cl.$^5$ .......................... G06K 7/10; G06K 7/015
[52] U.S. Cl. ................................ 235/375; 353/26 A; 235/454; 369/14
[58] Field of Search ...................... 355/6, 14 C, 40, 41, 355/202, 201; 353/25, 26 R, 26 A, 27 R, 27 A; 235/375, 383, 385, 419, 420, 454, 441, 436; 369/14, 30, 32, 47; 360/69; 364/518

[56] References Cited

U.S. PATENT DOCUMENTS

| | | | |
|---|---|---|---|
| 4,254,329 | 3/1981 | Gokey et al. | 353/27 A |
| 4,338,644 | 7/1982 | Staar | 360/69 |
| 4,443,858 | 4/1984 | Piaton | 353/27 A |
| 4,616,126 | 10/1986 | Yanagawa et al. | 235/375 |
| 4,652,939 | 3/1987 | Baumeister | 360/69 |
| 4,693,591 | 3/1987 | Saijo et al. | 353/26 R |
| 4,760,428 | 7/1988 | Watanabe et al. | 355/40 |
| 4,805,087 | 2/1989 | Frankel et al. | 235/462 |

FOREIGN PATENT DOCUMENTS 53-131048 11/1978 Japan ................................ 355/6

Primary Examiner—Stuart S. Levy
Assistant Examiner—Robert A. Weinhardt
Attorney, Agent, or Firm—Fitzpatrick, Cella, Harper & Scinto

[57] ABSTRACT

A retrieval apparatus for automatically retrieving a desired image on a recording medium having an image and information for retrieving the image, wherein a retrieval operation can be performed using various types of recording media. The retrieval apparatus has a card holding section for detachably holding a card storing retrieval data corresponding to a recording medium, and a reader for reading storage information of the card held by the card holding section.

15 Claims, 9 Drawing Sheets

RETRIEVAL APPARATUS READILY ADAPTABLE FOR USE WITH VARIOUS TYPES OF RECORDING MEDIA

BACKGROUND OF THE INVENTION

1. Field of the Invention

The present invention relates to a retrieval apparatus for automatically retrieving an image recorded on a recording medium such as a microfilm, tape, disk, and the like.

2. Related Background Art

In a reader printer and the like, the following retrieval method is known. Marks having a different density from the surrounding portions are respectively printed on a side portion of each image frame in order to retrieve image frames of a microfilm. During film convey, these marks are detected and are counted by a counter. When the count value coincides with a frame number of a desired image, the film is stopped, thereby retrieving a desired image. The retrieved image is projected onto a screen.

Since there are various types of films, a recording position of a mark with respect to an image and a size of the mark is not always the same.

FIG. 5 shows a partial structure of a roll microfilm, and shows four types of microfilms F1 to F4. Referring to FIG. 5, frames 1 recording images are aligned in line on the microfilm F1, and non-transparent frame marks m1 are recorded on the lower side of the respective frames. Each frame mark m1 is printed on each frame so that a distance between the left end (reference end) of the frame 1 and the left end (reference end) of the frame mark m1 becomes $\lambda 1$.

In the microfilm F2, non-transparent frame mark m2 is recorded on the upper side of each frame 1, so that a distance between the left end of frame 1 and the left end of frame mark m2 becomes $\lambda 2$.

In the microfilm F3, non-transparent marks m1 and m3 are recorded on the upper and lower sides of the frames 1. The frame marks m1 are provided to each frame, and the case marks m3 are provided to selected frames. The case mark m3 is recorded so that a distance between the left end of the frame 1 and the left end of the case mark m3 becomes $\lambda 3$. The case mark m3 has a different length in the film convey direction from that of the frame mark m1.

In the microfilm F4, non-transparent marks m1 and m3 are recorded on the upper sides of the frames. The case mark m3 is provided to the start frame of a series of frames which have associated image contents, and the frame mark m1 is provided to other frames. Various other microfilms are also known.

As shown in FIG. 5, the recording position, size, type and the like of the mark are different depending on the types of film. When a retrieval operation is performed using these films, a user must input predetermined retrieval/copy conditions corresponding to a selected film to set the apparatus in a retrieval mode suitable for the type of the film. For example, information corresponding to the mark recording position (distances $\lambda 1$, $\lambda 2$, and $\lambda 3$), information indicating a type of mark information indicating a negative or positive film or a transparent or non-transparent mark, and the like are input through a keyboard or the like to uniform a stop position of an image or to correctly detect a mark. However, the input operation of the retrieval conditions, i.e., the retrieval mode, is cumbersome, and the input operation to an input apparatus is often forgot. If the input operation is erroneously performed or is forgot, the stop position of an image is drifted and an image cannot be projected onto an appropriate position of a screen. When the projected image is to be copied, the image is partially deleted, or the image cannot be accurately retrieved.

SUMMARY OF THE INVENTION

It is an object of the present invention to provide a retrieval apparatus which is free from the conventional drawbacks and can accurately retrieve an image by a simple operation.

It is another object of the present invention to provide a retrieval apparatus which can use various types of recording media and can be automatically switched in a retrieval mode corresponding to a recording medium to be used.

It is still another object of the present invention to provide a retrieval apparatus which can accurately retrieve a target image of each recording medium while using recording media having different types of retrieval information.

According to the present invention, a retrieval apparatus comprises a card holding section for detachably holding a card which stores data corresponding to a type of recording medium having an image and information for retrieving the image, and detection means for detecting the storage information of the card held in the card holding section.

According to the present invention, a retrieval apparatus comprises nonvolatile storage means for storing information read by read means, and means for controlling a retrieval operation based on the information stored in the storage means.

DETAILED DESCRIPTION OF THE PREFERRED EMBODIMENTS

An embodiment of the present invention will now be described with reference to the accompanying drawings.

Figure 1:
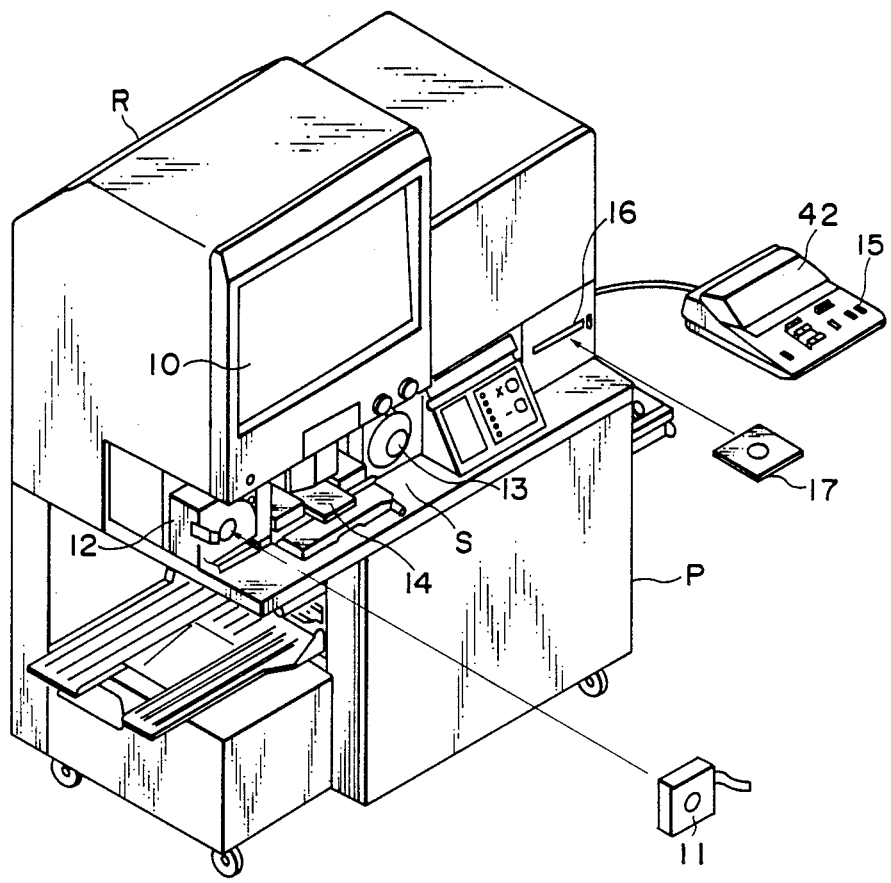
FIG. 1 is a perspective view of a microfilm reader to which the present invention is applied.

FIG. 1 shows a microfilm reader printer having an information retrieval apparatus to which the present invention is applied. The reader printer comprises a reader section R, a printer section P, and a retrieval section S.

The reader section R has a projection system (not shown) for projecting an image formed on a microfilm onto a screen 10. The printer section P has an optical system (not shown) for projecting an image on the microfilm onto a photosensitive body (not shown), and a known electrophotographic image forming means for developing the image on the photosensitive body and transferring the developed image onto a copy sheet.

The retrieval section S has a cartridge receive unit 12 for detachably holding a cartridge 11 in which a microfilm is stored in the form of a roll, a film convey mechanism for conveying the microfilm in the cartridge held by the cartridge receive unit to a takeup real 13, a mark detector 14 for detecting marks on the microfilm, and a keyboard 15 for inputting retrieval data, such as a key word, address data, and the like.

A memory card 17 (to be described later) is inserted in a card insertion port 16 of the card receive unit for detachably holding the memory card. The memory card 17 stores predetermined retrieval and copy conditions, i.e., a retrieval mode, corresponding to a film to be used. The selected card 17 is inserted in the card receive unit through the card insertion port 16.

Figure 2:
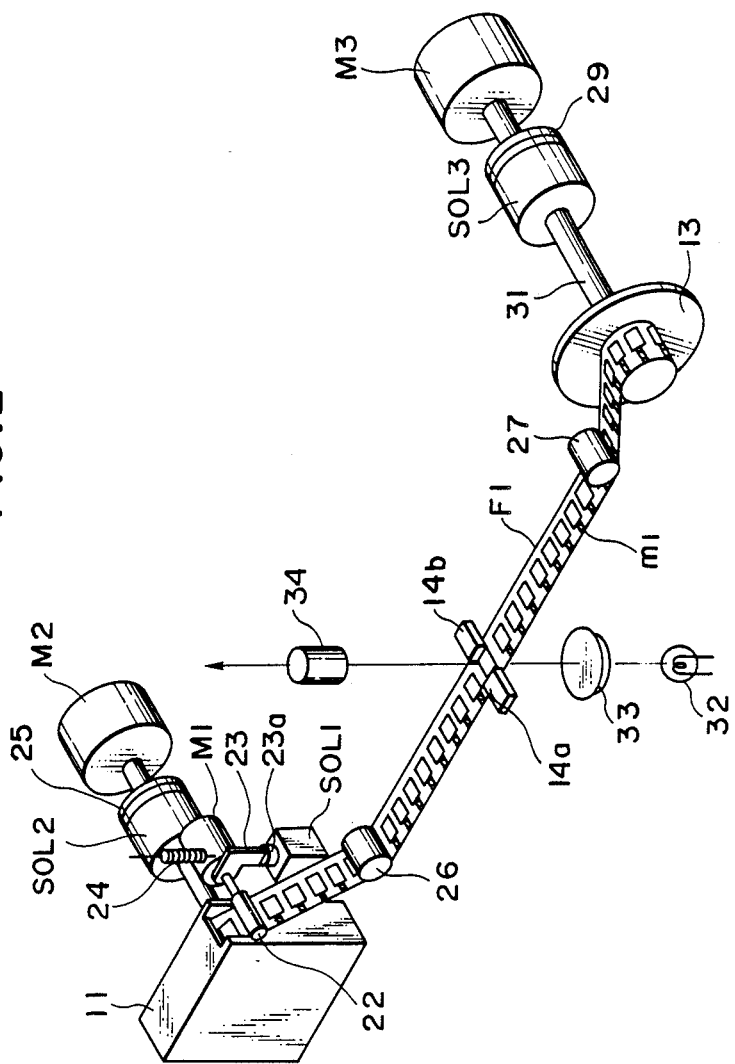
FIG. 2 is a schematic perspective view of a retrieval section.

FIG. 2 schematically shows the retrieval section S. A cartridge storing a microfilm F1 is used. The retrieval section S includes the capstan roller 22 for feeding the microfilm F1 stored in the cartridge 11, a motor M1 for driving the capstan roller 22, a motor M2 for rewinding the film on a film reel in the cartridge, a solenoid SOL1 for causing the capstan roller 22 to be in contact with the microfilm F through a support arm 23, a spring 24 for moving the support arm 23, a plunger 23a, and the capstan roller 22 to separate the capstan roller 22 from the microfilm, and a brake solenoid SOL2 for the film rewind motor M2. When the brake solenoid SOL2 is inoperative, the feed spool motor M2 is rotatable. When the brake solenoid SOL2 is operated, a brake plate 25 fixed to a motor shaft is attracted to prevent rotation of the motor M2.

The section S also includes film guide rollers 26 and 27, a film takup motor M3 for driving the takeup reel 13, and a brake solenoid SOL 3 for the motor M3.

Although not shown, a guide plate for guiding a film is arranged along a film feed path between the cartridge 11 and the takeup reel 13.

The section S also includes a lamp 32 for illuminating the microfilm F, a condensor lens 33, and a projection lens 34 for enlarging and projecting an image on the microfilm F illuminated with the lamp 32 onto the screen 10 or a photosensitive body.

The mark detector 14 is constituted by a first mark detector 14a for detecting a mark formed on the lower side of the microfilm, and a second mark detector 14b for detecting a mark formed on the upper side of the microfilm. The mark detectors 14a and 14b each have photoelectric conversion elements for detecting the presence/absence of the mark. When the microfilm F is conveyed, a light beam emitted from the lamp 32 is shielded by a mark m1, and the photoelectric conversion element generates a mark detection signal. The mark detection signal is mounted by a counter. The retrieval apparatus using the mark detection signal is known to those skilled in the art, and a detailed description thereof is omitted.

When a frame number of a desired frame is input to an input apparatus of the retrieval apparatus, the motor M1 is rotated, and the solenoid SOL 1 is actuated. Then, the capstan roller 22 is brought into contact with the microfilm F1 outside the cartridge 11 to feed the microfilm F1 from the cartridge 11. The distal end of the microfilm F1 is conveyed toward the takeup reel 13. When the distal end of the microfilm comes closer to the takeup reel 13, the takeup motor M3 is rotated, and the distal end of the microfilm is wound around the takeup reel 13, thus completing an auto-loading operation. Then, the motor M1 and the solenoid SOL1 are rendered inoperative. The microfilm F1 is from then on conveyed by rotation of the takeup reel 13.

During conveyance of the microfilm, the number of marks m1 detected by the mark detector 14 is counted by the counter. The count value is compared with the input frame number. When a coincidence is established therebetween, a stop signal is generated from the counter, and the brake solenoid SOL3 is energized to brake a takeup shaft 31. The solenoid SOL 2 also brakes the shaft of the motor M2 to prevent inertial rotation of the feed spool. In this manner, the conveyance of the microfilm is stopped, and a frame image of a designated number is projected onto the screen through the projection lens.

Figure 3:
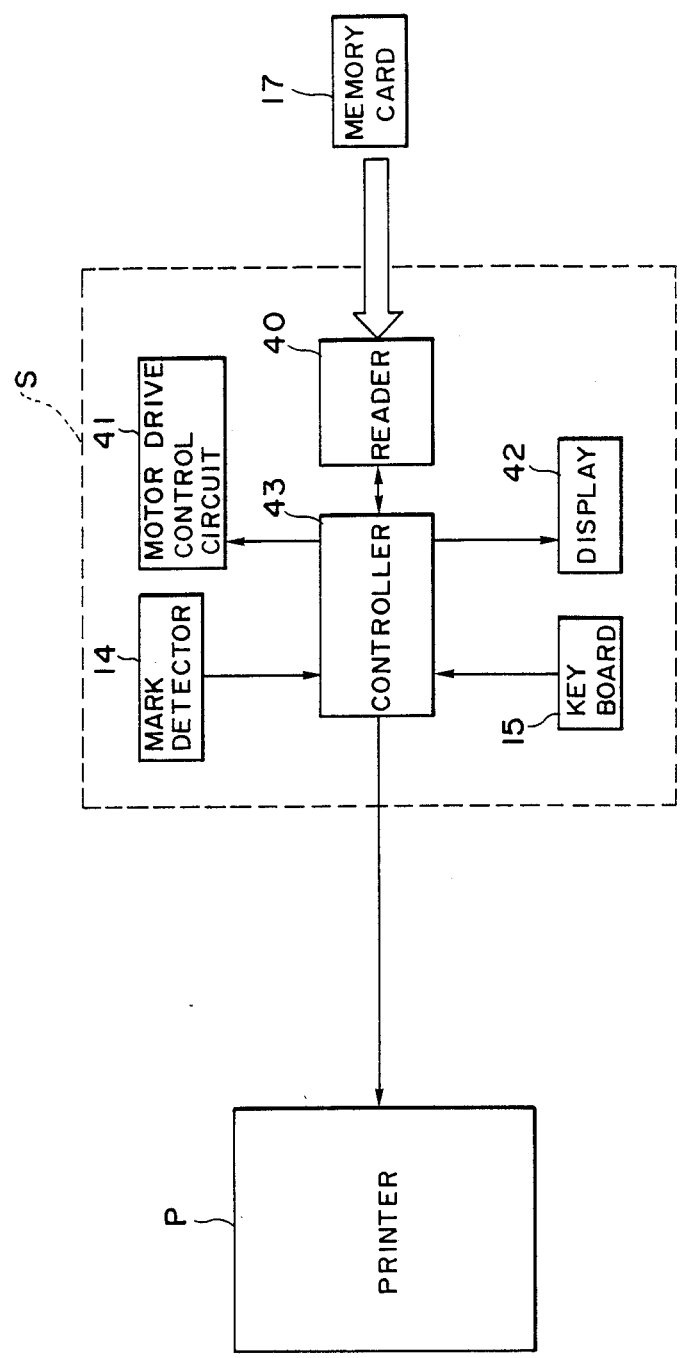
FIG. 3 is a block diagram of the retrieval section.

FIG. 3 is a block diagram of a retrieval control circuit The retrieval control circuit comprises a reader 40 for reading storage information of the memory card 17 held by the card receive unit, a motor drive control circuit 41 for controlling the film conveyance motors and the brake mechanism, a display 42, and a controller 43 having a microcomputer. The controller 43 has a central processing unit (CPU), a ROM, a RAM, an I/O port, and the like.

The controller 43 receives the mark detection signal from the mark detector 14, an information signal from the memory card read by the reader 40, and an instruction signal from the keyboard 15. The controller 43 outputs a necessary control signal to the motor drive control circuit 41, a print control signal to the printer section P, and a display drive signal to, the display 42.

As the memory card 17, an IC card which comprises an IC chip packaged in a card-like substrate, a magnetic card prepared by coating a magnetic material on the surface of the card-like substrate, or the like is used. The card can employ various shapes, such as a rectangular shape, a disk shape (e.g., a floppy disk or an optomagnetic disk), and the like.

The memory card 17 stores control information such as retrieval and copy conditions corresponding to a microfilm. For example, the card 17 stores information associated with an image polarity indicating a positive or negative film, information associated with a density of a mark indicating a transparency or non-transparency of the mark, information associated with the position of a mark indicating whether the mark is present on the upper or lower side of the microfilm or on both the sides, information for controlling a stop position of a frame in accordance with a recording position of the mark (distances $\lambda 1$ to $\lambda 3$) with respect to the frame, mark form information associated with a length and a type of the mark, information indicating a photographing magnification of an image, and the like. The memory cards are prepared in correspondence with the microfilms F1 to F4. Each memory card stores control information, i.e., information for setting L retrieval mode, inherent to the corresponding microfilm.

Figure 4:
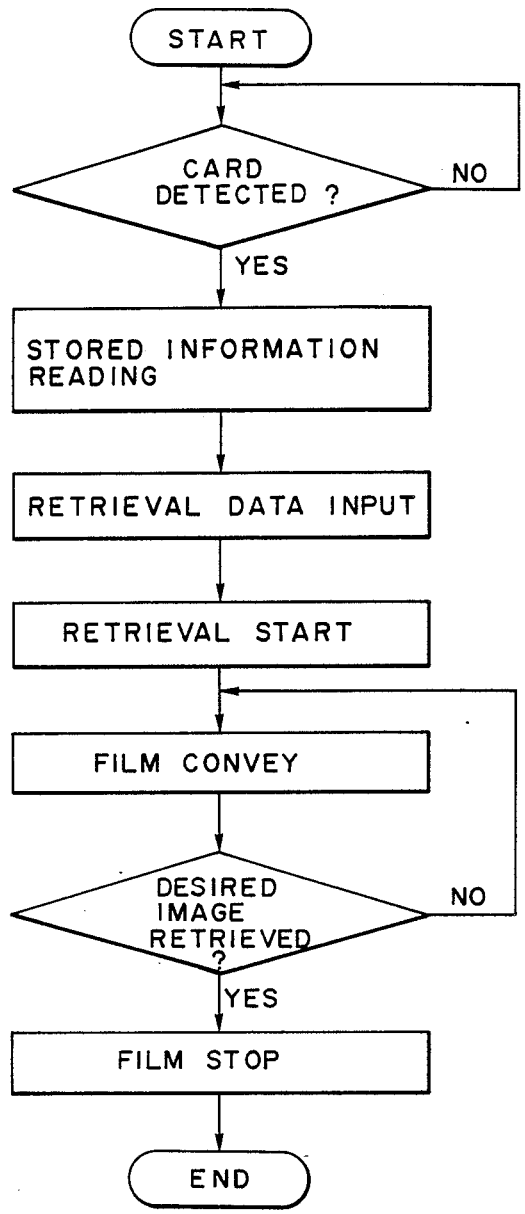
FIG. 4 is a flow chart of an operation.
Figure 5:
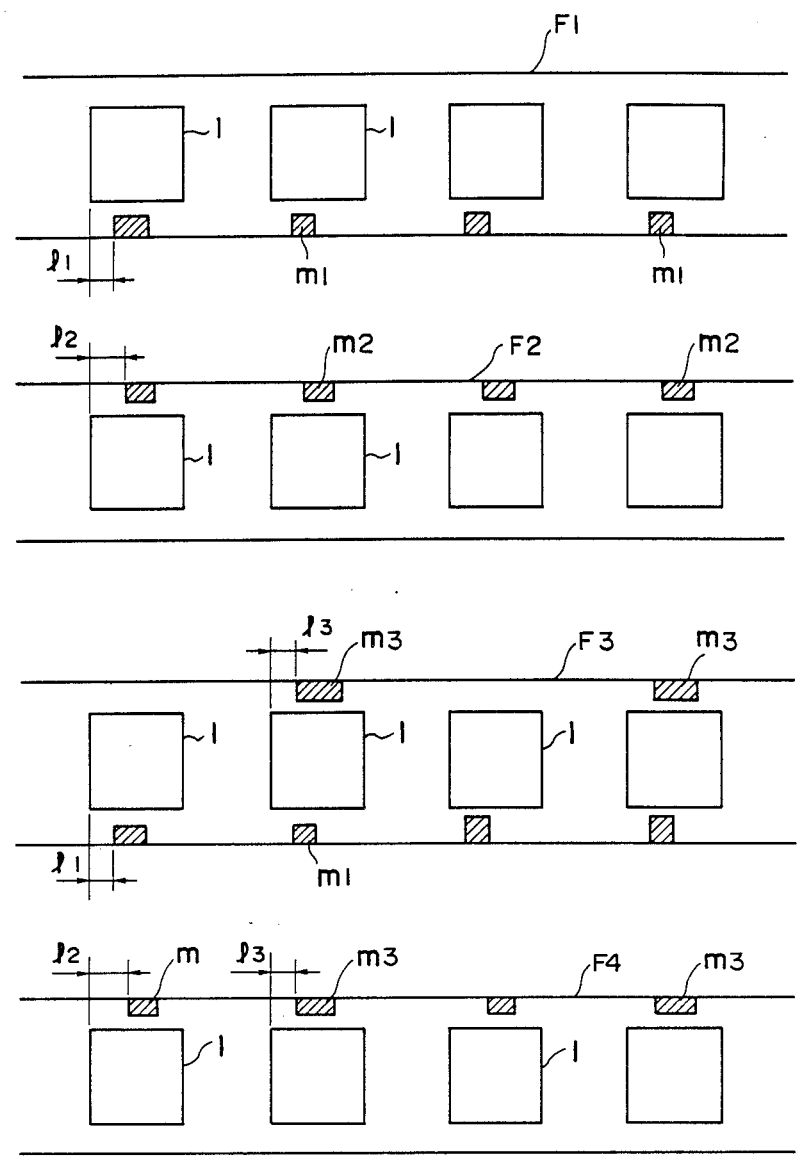
FIG. 5 is a front view of microfilms.

FIG. 4 is a flow chart of the operation.

An operation of this embodiment will now be described. The cartridge 11 is attached to a predetermined position of the retrieval section, and the memory card 17 corresponding to the microfilm stored in the cartridge 11 is inserted in the predetermined card receive unit through the card insertion port 16. When the memory card 17 is set at the predetermined position, the reader 40 detects the card 17, and reads the information stored in the card. The reader 40 then outputs an information signal and sends it to the controller 43. Upon reception of the information signal, the controller 43 sets the retrieval mode in a predetermined mode, and controls the retrieval operation based on the information signal during retrieval. An operator then inputs address data of an image to be retrieved (e.g., a frame number) from the keyboard 15, and instructs to start retrieval. Then, the microfilm is conveyed.

Based on the mark density information stored in the memory card, the controller 43 determines whether a high- or low-level signal output from the mark detector 14 is to be counted by the counter as the mark detection signal. If the mark is transparent, the high detection level output signal from the detector 14 is counted. If the mark is non-transparent the low-level output signal is counted. Based on the mark position information stored in the memory card, the controller 43 determines whether an output signal from the mark detector 14a or 14b is to be sent to the counter. More specifically, in the case of the mark position information corresponding to the microfilms F1 and F3, only the output signal from the mark detector 14a is sent to the counter. In the case of the mark position information corresponding to the microfilm F2, only the output signal from the mark detector 14b is sent to the counter. In the case of the mark position information corresponding to the microfilm F3, both the output signals from the mark detectors 14a and 14b are sent to the counter.

Furthermore, the controller 43 controls the brake mechanism based on the stop position information so that an image is always stopped at the predetermined position. The ROM in the controller 43 stores film stop data corresponding to distances $\lambda1, \lambda2, \lambda3, \ldots$ between the reference ends of the frame and the mark. The controller 43 reads out, from the ROM, the film stop data corresponding to the stop position information stored in the memory card, and determines a time interval from when the mark of a desired image is detected until the film is stopped. More specifically, a time interval from when the mark is detected until the brake is actuated is changed in accordance with the recording position of the mark, so that an image can be stopped at a predetermined position. Note that position correction data corresponding the above distances can be stored in the ROM. In this case, when the mark of the desired image is detected the microfilm is immediately stopped, and the microfilm is conveyed in a predetermined direction by a predetermined distance based on the position correction data corresponding to the stop position information stored in the memory card, thereby correcting the stop position of the image.

The controller 43 is controlled to discriminate and count the mark detection signal output from the mark detector 14 based on the mark form information stored in the memory card. For example, if the memory card using the microfilm F3 is inserted, the controller 43 causes a first counter to count the mark detection signal output from the first mark detector 14a based on the mark form information stored in the memory card, and causes a second counter to count the mark detection signal output from the second mark detector 14b.

When the memory card using the microfilm F4 is inserted, the controller 43 discriminates the frame mark m1 and the case mark m3 in accordance with a pulse width of the mark detection signal based on the mark form information stored in the memory card, and sends the mark detection signal of the frame mark to the first counter and the mark detection signal of the case mark to the second counter. Note that the counters comprise digital counters allocated in a predetermined area of the RAM of the controller 43.

When the desired image is retrieved, the microfilm is stopped at the predetermined position based on the stop position information, and a desired frame is correctly projected at the predetermined position of the screen.

When the image of this frame is to be copied, a print button is operated. When a print instruction is supplied, the controller 43 controls the printer section P based on the image polarity information, density information, magnification information, and the like. For example, the printer section P determines based on the image polarity information whether a polarity of a charger for charging a photosensitive body is changed to always obtain a positive copied image or either a positive or negative developer is operated.

Based on the density information, a supply voltage of the lamp 32 for illuminating the microfilm is controlled to adjust the density of a copied image. Based on the magnification information, a projection magnification of the image is changed.

The retrieval information provided on the microfilm is not limited to the mark in this embodiment but can be a bar code, numerals, letters, and the like.

The image recording medium is not limited to the microfilm but can be an optical disk, a magnetic disk, a magnetic tape, and the like.

Figure 6:
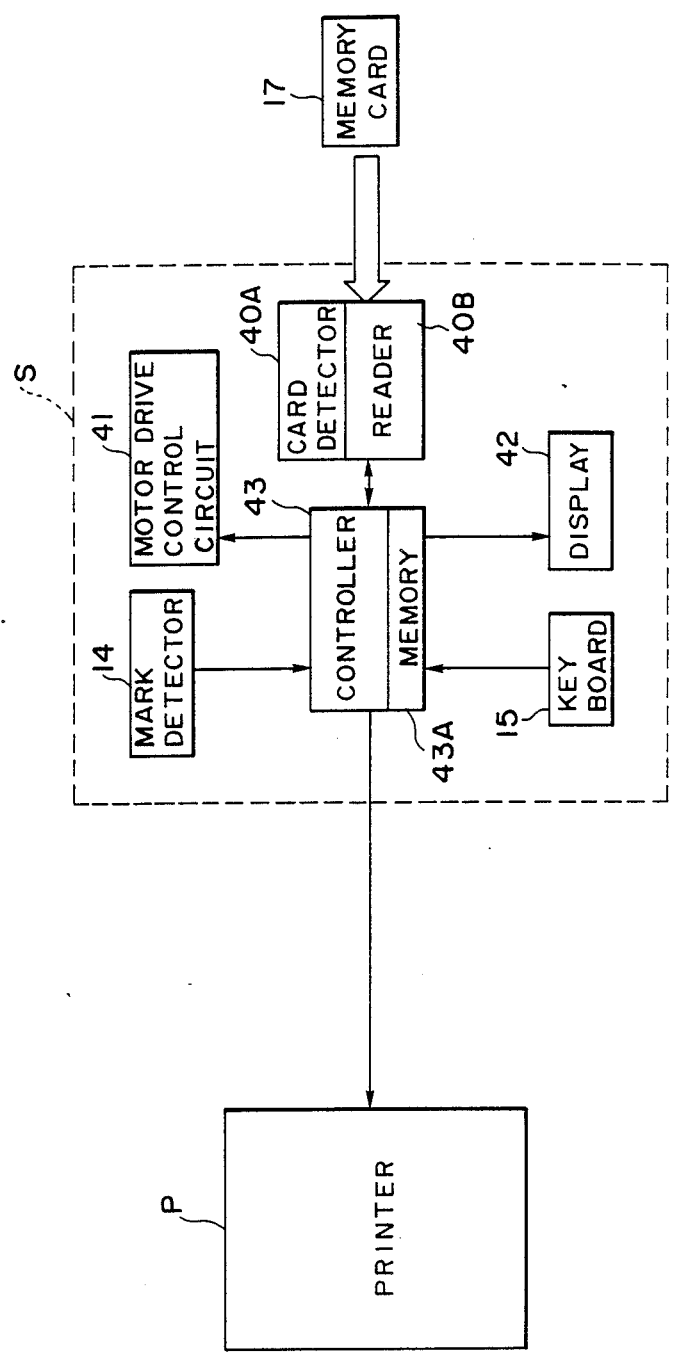
FIG. 6 is a block diagram showing a retrieval section according to another embodiment of the present invention.

According to the present invention, an input operation cannot be erroneously performed or forgot, and a desired image can always be retrieved. The retrieved image can be stopped at a predetermined position, resulting in a very simple operation FIG. 6 is a block diagram of a retrieval control circuit according to another embodiment of the present invention. The same reference numerals in this embodiment denote the same parts as in the above embodiment.

The control circuit of this embodiment includes a card detector 40A for detecting whether or not a memory card is inserted in a card receive unit and a reader 40B for reading storage information of a memory card 17 inserted in the card receive unit.

A programmable nonvolatile memory 43A in a controller 43 stores the storage information of the memory card read by the reader 40B. After the memory card is ejected from the card receive unit, the memory 43A retains its memory content. After a power switch of the apparatus is turned off, the memory 43A also retains its content by a backup power source. When a new memory card is inserted in the card receive unit, the memory 43A erases its memory content and stores the storage information of the new card.

Figure 7:
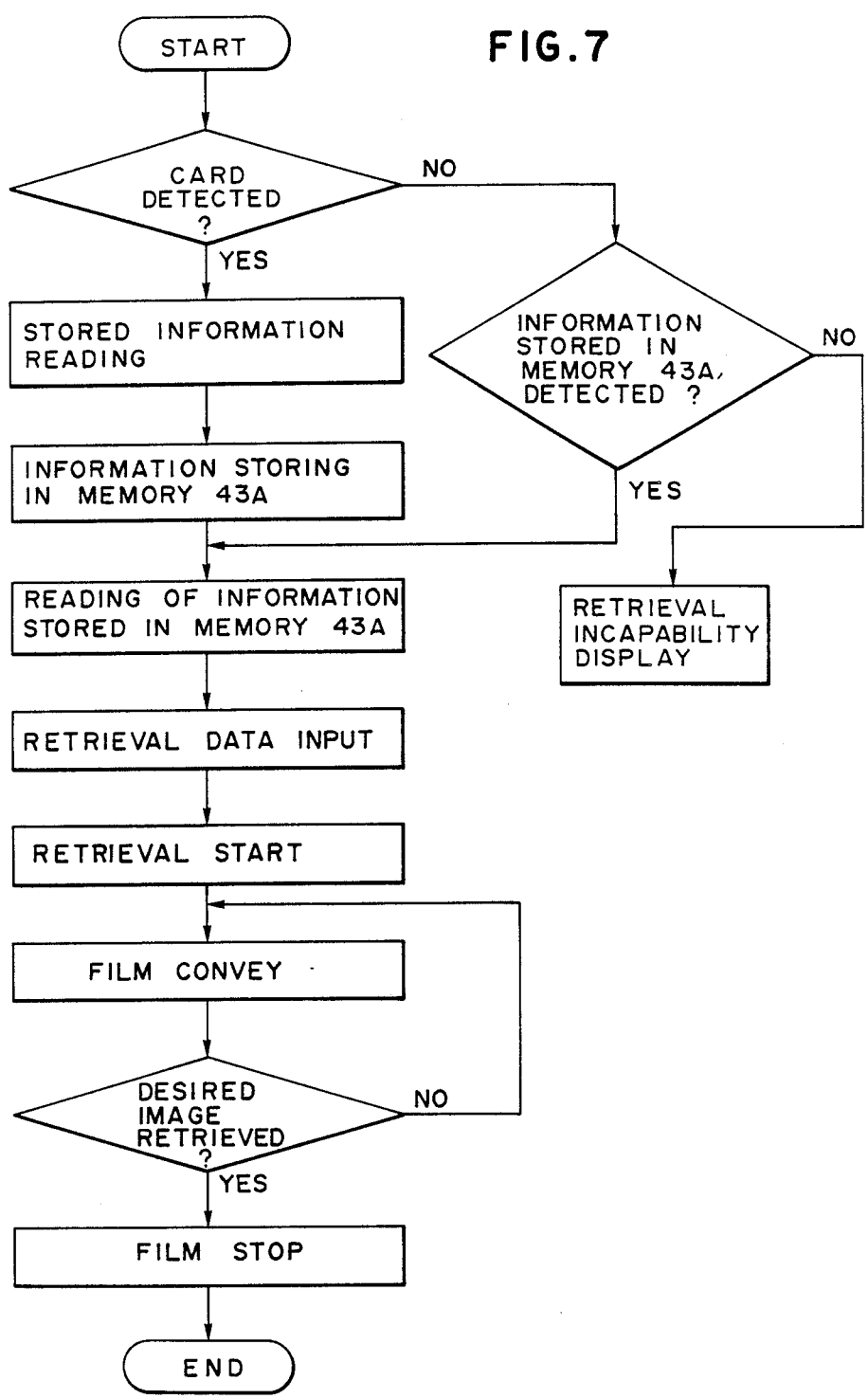
FIG. 7 is a flow chart of an operation of the embodiment shown in FIG. 6.

FIG. 7 is a flow chart of a retrieval operation of the embodiment shown in FIG. 6 The operation of this embodiment will be described with reference to the flow chart shown in FIG. 7. The cartridge 17 is attached to the predetermined position of the retrieval section, and a memory card corresponding to the microfilm stored in the cartridge 11 is inserted in the predetermined card receive unit through the card insertion port 16. When the memory card 17 is inserted at the predetermined position, the card detector 40A detects the card 17, and the reader 40B reads the information stored in the card. The reader 40B outputs an information signal and sends it to the memory 43A of the controller 43 to be stored therein. Based on the information signal stored in the memory 43A, the controller 43 switches the retrieval mode of the apparatus so that the retrieval and copy operations suitable for the microfilm to be used can be performed. An operator inputs address data of an image to be retrieved (e.g., a frame number), and instructs to start retrieval. Then, the microfilm is conveyed.

Based on the mark density information of the memory card stored in the memory 43A, the controller 43 determines whether a high- or low-level output signal from the mark detector 14 is to be counted as a mark detection signal. For example, if the mark is transparent, the high-level output signal is counted. If the mark is non-transparent, a low-level output signal is counted. Based on the mark position information of the memory card stored in the memory 43A, the controller 43 determines whether an output signal from the mark detector 14 $a$ or 14$b$ is to be sent to the counter. More specifically, in the case of mark position information corresponding to the microfilm F1 or F3, only an output signal from the mark detector 14$a$ is sent to the counter. In the case of the mark position information corresponding to the microfilm F2, only an output signal from the mark detector 14$b$ is sent to the counter. In the case of the mark position information corresponding to the microfilm F3, output signals from the mark detectors 14$a$ and 14$b$ are sent to the counter.

Furthermore, the controller 43 controls the brake mechanism based on the stop position information so that an image is always stopped at the predetermined position. The ROM in the controller 43 stores film stop data corresponding to distances $\lambda 1, \lambda 2, \lambda 3, \ldots$ between the reference ends of the frame and the mark. The controller 43 reads out, from the ROM, the film stop data corresponding to the stop position information of the memory card stored in the memory 43A, and determines a time interval from when the mark of a desired image is detected until the film is stopped.

The controller 43 is controlled to discriminate and count the mark detection signal output from the mark detector 14 based on the mark form information stored in the memory card.

When a desired image is retrieved, the microfilm is stopped at the predetermined position based on the stop position information, and a desired frame is projected onto the predetermined position of the screen.

When the image of this frame is to be copied, a print button is operated. When a print instruction is generated, the controller 43 controls the printer section P based on the image polarity information, density information, magnification information, and the like stored in the memory 43A.

After use of the cartridge 11 is completed, it is removed from the cartridge receive unit, and the memory card 17 is removed from the predetermined position. When a new cartridge 11 (which stores the same type of microfilm as that in the immediately preceding cartridge) is used, a correct retrieval operation can be performed without inserting the memory card 17. More specifically, when a new cartridge 11 is attached to the cartridge receive unit and the card detector 40A detects no memory card, the flow advances to the step to check if the information of the previously used memory card is retained in the memory 43A. When the memory 43A stores the information of the previously used memory card, the storage information of the memory 43A is read, and the retrieval operation of the desired image of the microfilm in the new cartridge 11 can be performed through the same steps as described above.

Information stored in the memory 43A is retained until a new memory card is inserted. When a new memory card is inserted, the storage information of the memory 43A is erased, and the information of the new memory card is stored in the memory 43A. Therefore, after the memory card 17 is removed, the retrieval operation can be correctly performed only by exchanging a cartridge corresponding to this memory card. As long as cartridges having the same type of microfilm are used, the memory card need not be inserted.

When a microfilm of a different type from that in the immediately preceding cartridge 11 is used, a memory card corresponding to the microfilm to be used can be inserted in the predetermined position When a new cartridge is used, if the card detector 40A detects no memory card and the memory 43A stores no information, the flow advances to the step of displaying a retrieval incapability. The display 42 displays that the retrieval operation cannot be performed unless a memory card is inserted In this state, the retrieval operation is inhibited. While the display 42 displays the retrieval incapability, a memory card corresponding to the microfilm in a cartridge to be used can be inserted at the predetermined position, so that the retrieval inhibition is canceled, and the retrieval operation can be performed. Note that when the memory card is inserted at the predetermined position or when the storage information of the memory card is retained n the memory 43A, a mode corresponding to the memory card, and individual or specific contents of the storage information can be displayed on the display 42, thereby signaling a mode of a usable microfilm to a user.

In the above embodiment the memory card is attached to or detached from the apparatus body. However, the memory card can be attached to or detached from a keyboard or can be attached to a cartridge to be attached to or detached from the apparatus body together with the cartridge.

Figure 8:
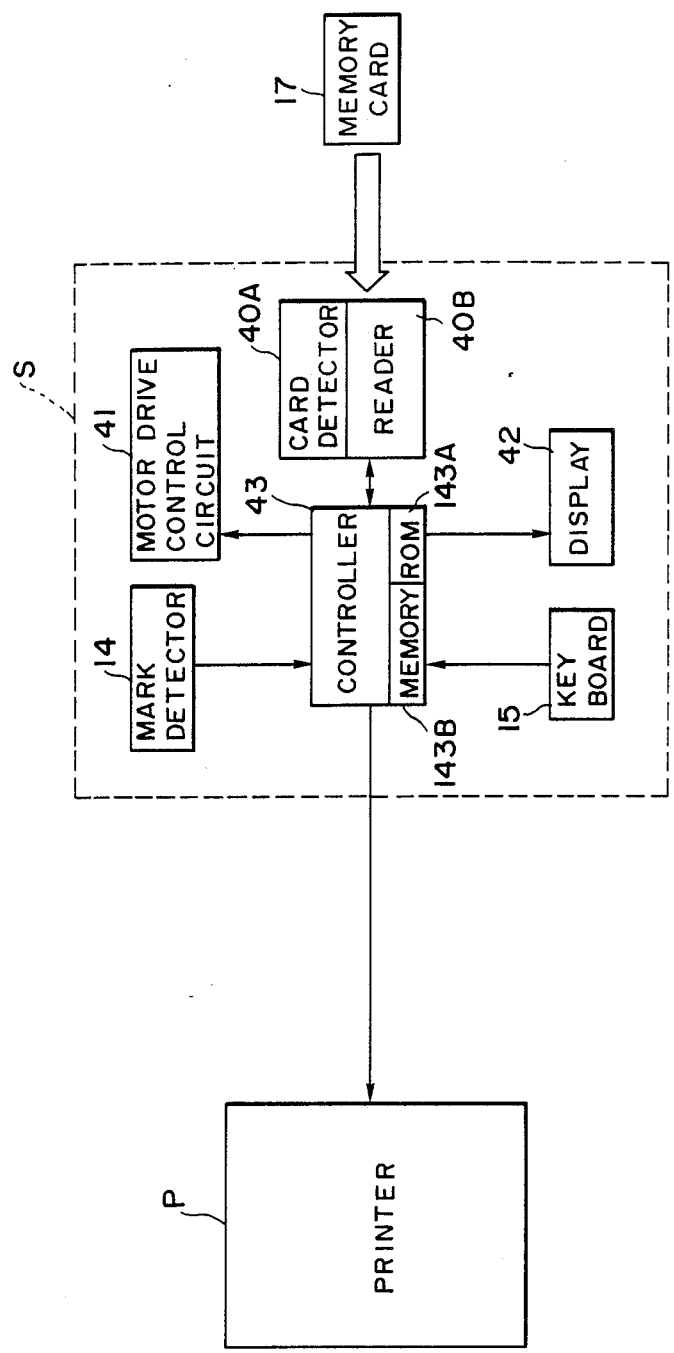
FIG. 8 is a block diagram showing a retrieval section according to still another embodiment of the present invention.
Figure 9:
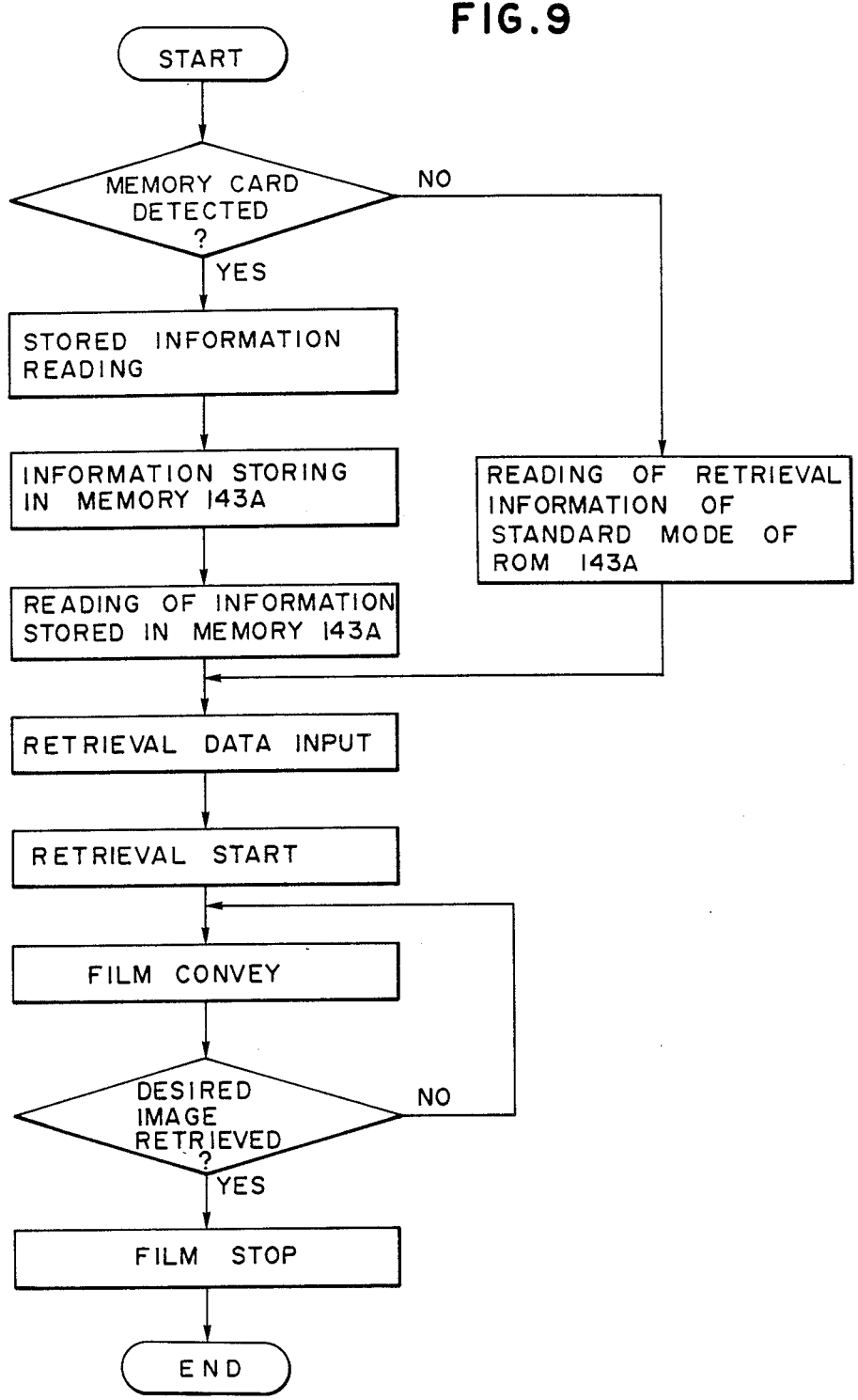
FIG. 9 is a flow chart of an operation of the embodiment shown in FIG. 8.

FIG. 8 is a block diagram of a retrieval circuit according to still another embodiment of the present invention, and FIG. 9 is a flow chart of the retrieval operation of the embodiment shown in FIG. 8. Referring to FIG. 8, a controller 43 has a ROM 143A. The ROM 143A stores information for performing a retrieval operation in a standard retrieval mode. A programmable memory 143B stores storage information of a memory card read by a reader 40B. When the memory card is removed from the card receive unit, the memory content of the memory 143B is cleared. When a new memory card is inserted in the card receive unit, the memory 143B stores the storage information of the new memory card.

Note that in this embodiment, a mode using the microfilm F1 is called a standard mode.

The memory cards are prepared in correspondence with the microfilms F2 to F4 except for the microfilm F1 in the standard mode. Each memory card stores a retrieval condition suitable for a corresponding microfilm.

For example, each memory card stores information associated with an image polarity indicating a positive or negative film, information associated with a density of a mark indicating a transparency or non-transparency of the mark, information associated with the position of mark indicating whether the mark is present on the upper or lower side of the microfilm or on both the portions, information for controlling a stop position of a frame in accordance with a recording position of the mark (distances λ1 to λ3) with respect to the frame, mark form information associated with a length and a type of the mark, information indicating a photographing magnification of an image, and the like. The memory cards are prepared in correspondence with the microfilms F2 to F4. Each memory card stores the above retrieval information, i.e., retrieval and copy mode setting conditions, inherent to the corresponding microfilm. The ROM 143A of the controller 43 stores retrieval and copy mode setting conditions corresponding to the microfilm F1 as a microfilm of the standard mode, control information for performing a retrieval operation in the standard mode, and the like.

The operation of this embodiment will now be described.

First, the cartridge 11 is attached to the predetermined position of the retrieval section. When the microfilm in the cartridge 11 is a microfilm of the standard mode, no memory card is required In this case, the memory card detector 40A signals to the controller 43 that no memory card is present. Therefore, the controller 43 sets the retrieval apparatus in the standard mode. The controller 43 controls the retrieval and copy operations based on the information stored in the ROM 143A. On the other hand, when the microfilm in the cartridge 11 is a microfilm other than the standard mode, a memory card corresponding to the selected one of the microfilms F2 to F4 is inserted in the predetermined card receive unit through the card insertion port 16. When the memory card 17 is inserted at the predetermined position, the card detector 40A detects the card 17, and the reader 40B reads the information stored in the card. The reader 40B sends the information signal to the memory 143B of the controller 43 to store it therein. The controller 43 controls the retrieval and copy operation based on the information signal stored in the memory 143B. An operator then inputs address data of an image to be retrieved (e.g., a frame number) from the keyboard 15, and instructs to start retrieval. Then, the microfilm is conveyed.

Based on the standard mode information stored in the ROM 143A or the mark density information of the memory card stored in the memory 143B the controller 43 determines whether a high- or low-level output signal from the mark detector is to be counted by the counter as a mark detection signal. For example, if a mark is transparent, a high-level output signal is counted. If a mark is non-transparent, a low-level output signal is counted. Based on the mark position information in the standard mode or the mark position information of the memory card stored in the memory 143A, the controller 43 determines whether an output signal from the mark detector 14a or 14b is to be sent to the counter. For example, in the case of the mark position information corresponding to the microfilm F1 or F3, only an output signal from the mark detector 14a is sent to the counter. In the case of the mark position information corresponding to the microfilm F2, only an output signal from the mark detector 14b is sent to the counter. In the case of the mark position information corresponding to the microfilm F3, output signals from the mark detectors 14a and 14b are sent to the counter.

Furthermore, the controller 43 controls the brake mechanism based on the stop position information so that an image is always stopped at the predetermined position. The ROM in the controller 43 stores film stop data corresponding to distances λ1, λ2, λ3, . . . between the reference ends of the frame and the mark. The controller 43 reads out, from the ROM, the film stop data corresponding to the stop position information stored in the memory card, and determines a time interval from when the mark of a desired image is detected until the film is stopped.

The controller 43 is controlled in accordance with mark form information of the standard mode stored in the ROM 143A or mark form information stored in the memory case so as to discriminate and count the mark detection signal output from the mark detector 14.

When a desired image is retrieved, the microfilm is stopped at the predetermined position based on the stop position information, and a desired frame is correctly projected on the predetermined position of the screen.

When the image of this frame is to be copied, a print button is operated. When a print instruction is generated, the controller 43 controls the printer section P based on the standard mode or image polarity information, density information, magnification information and the like stored in the memory 143B.

After use of the cartridge 11 is completed, it is removed from the cartridge receive unit, and the memory card 17 is removed from the predetermined position. When a new cartridge 11 is used, if it stores a microfilm other than the standard mode, the memory card 17 corresponding to the microfilm to be used can be inserted to perform a correct retrieval operation.

More specifically, when a new cartridge is attached to the cartridge receive unit and a memory card corresponding to the microfilm in the cartridge is inserted in the card receive unit, the card detector 40A detects the memory card, and the reader 40B reads the storage information of the memory card. Then, the retrieval operation of desired image information of the microfilm in the new cartridge can be performed through the same steps as described above. When no memory card is inserted, since the standard mode is selected, a cartridge having a microfilm of the standard mode can be attached, and the correct retrieval operation can be performed. When the memory card is not inserted at the predetermined position or when no memory card is inserted, the standard mode or a mode corresponding to a memory card, and individual or specific contents of the mode can be displayed on the display 42, thereby signaling a mode of a usable microfilm to a user.

The mode using the microfilm F1 is set as the standard mode. However, modes using other microfilms can be set as the standard mode.

We claim:

1. An image retrieval apparatus for use with various types of recording media having different kinds of image and retrieval information, comprising:
   holding means for detachably holding a card storing data corresponding to a type of the recording medium;
   retrieval means for detecting the retrieval information on the recording medium and retrieving a selected image on the recording medium based on the detected retrieval information;
   read means for reading the data stored in the card attached to said holding means; and
   control means for controlling a detecting operation of the retrieval information by said retrieval means based on the data read by said read means.

2. An apparatus according to claim 1, wherein said apparatus further has storage means for storing the data read by said read means, with the detecting operation being controlled based on the data stored in said storage means when a card is not attached to said holding means.

3. An apparatus according to claim 2, wherein said storage means includes a nonvolatile memory.

4. An apparatus according to claim 1, wherein said apparatus further has storage means for prestoring predetermined data and selection means for selecting either of the data stored in said storage means and the data read by said read means, with the detecting operation being controlled based on the data selected by said selection means.

5. An apparatus according to claim 1, wherein the data stored in the card includes information associated with a shape of the retrieval information.

6. An apparatus according to claim 1, wherein the data stored in the card includes a position of the retrieval information relative to the image.

7. An apparatus according to claim 1, wherein the data stored int he card includes information associated with a positive or negative image on said recording medium.

8. An apparatus according to claim 1, wherein the data stored int he card includes information associated with a density of said recording medium.

9. An image retrieval apparatus which retrieves a desired image recorded on an image recording medium with use of a retrieval mark provided thereon, comprising:
holding means for detachably holding a card storing control information corresponding to the type of retrieval mark on the recording medium;
read means for reading the control information on the card held by said holding means;
retrieving mans for detecting a retrieval mark on the image recording medium and retrieving an image on said image recording medium based on the detected retrieval information; and
means for setting a condition for detecting the retrieval mark by said retrieving means based on the control information read by said read means.

10. An apparatus according to claim 9, wherein said image recording medium comprises a microfilm.

11. An apparatus according to claim 9, wherein the control information stored in the card includes information associated with a size of the mark.

12. An apparatus according to claim 9, wherein the control information stored in the card includes information associated with a type of the mark.

13. An apparatus according to claim 9, wherein the control information stored int he card includes information associated with a density of the recording medium.

14. An apparatus according to claim 9, wherein the control information stored in the card includes a position of the mark relative to the image.

15. An apparatus according to claim 9, wherein the control information stored in the card includes information associated with a positive or negative image of the mark.

* * * * *

UNITED STATES PATENT AND TRADEMARK OFFICE
CERTIFICATE OF CORRECTION

PATENT NO. : 4,972,068
DATED : November 20, 1990
INVENTOR(S) : Akazuo Ohtani, et al.

It is certified that error appears in the above-identified patent and that said Letters Patent is hereby corrected as shown below:

COLUMN 1:

Line 34, "$\lambda 1.$" should read --$\ell 1.$--.

Line 38, "$\lambda 2.$" should read --$\ell 2.$--.

Line 45, "$\lambda 3.$" should read --$\ell 3.$--.

Line 61, "(distances $\lambda 1,$" should read --(distances $\ell 1,$--.

Line 62, "$\lambda 2,$ and $\lambda 3$)," should read --$\ell 2,$ and $\ell 3$),--

COLUMN 4:

Line 55, "(distances $\lambda 1$ to $\lambda 3$)" should read --(distances $\ell 1$ to $\ell 3$)--.

Line 61, "L" should read --a--.

COLUMN 5:

Line 17, "high detection" should read --high--.

Line 19, "non-transparent" should read --non-transparent,--.

Line 37, "distances $\lambda_1, \lambda_2, \lambda_3,$" should read --distances $\ell_1, \ell_2, \ell_3,$--.

UNITED STATES PATENT AND TRADEMARK OFFICE
CERTIFICATE OF CORRECTION

PATENT NO. : 4,972,068

DATED : November 20, 1990

INVENTOR(S) : Akazuo Ohtani, et al.

It is certified that error appears in the above-identified patent and that said Letters Patent is hereby corrected as shown below:

COLUMN 7:

Line 34, "distances $\lambda_1, \lambda_2, \lambda_3,$" should read --distances $\ell_1, \ell_2, \ell_3,$--.

COLUMN 9:

Line 4, "(distances $\lambda_1$ to $\lambda_3$)" should read --(distances $\ell_1$ to $\ell_3$)--.

COLUMN 10:

Line 2, "distances $\lambda_1, \lambda_2, \lambda_3,$" should read --distances $\ell_1, \ell_2, \ell_3,$--.

COLUMN 11:

Line 25, "int he" should read --in the--.

Line 30, "int he" should read --in the--.

UNITED STATES PATENT AND TRADEMARK OFFICE
CERTIFICATE OF CORRECTION

PATENT NO. : 4,972,068

DATED : November 20, 1990

INVENTOR(S) : Akazuo Ohtani, et al.

It is certified that error appears in the above-identified patent and that said Letters Patent is hereby corrected as shown below:

COLUMN 12:

Line 8, "retrieving mans" should read --retrieving means--.

Line 24, "int he" should read --in the--.

Signed and Sealed this

Twenty-ninth Day of September, 1992

Attest:

DOUGLAS B. COMER

Attesting Officer

Acting Commissioner of Patents and Trademarks